US007990258B2

(12) United States Patent
Fukui

(10) Patent No.: US 7,990,258 B2
(45) Date of Patent: Aug. 2, 2011

(54) OIL EXCHANGE TIMING INDICATING APPARATUS FOR VEHICLES

(75) Inventor: Kunihiko Fukui, Saitama (JP)

(73) Assignee: Honda Giken Kogyo Kasbushiki Kaisha, Tokyo (JP)

( * ) Notice: Subject to any disclaimer, the term of this patent is extended or adjusted under 35 U.S.C. 154(b) by 2792 days.

(21) Appl. No.: 09/902,711

(22) Filed: Jul. 12, 2001

(65) Prior Publication Data

US 2002/0029618 A1 Mar. 14, 2002

(30) Foreign Application Priority Data

Jul. 12, 2000 (JP) ................................ 2000-211678

(51) Int. Cl.
*B60Q 1/00* (2006.01)

(52) U.S. Cl. ..................... 340/450.3; 340/438; 340/450; 340/457.4; 340/618; 340/309.16; 73/53.01; 73/53.04; 701/29

(58) Field of Classification Search ............... 340/450.3, 340/309.15, 450, 457, 457.4, 438, 439, 618, 340/309.16; 701/29, 30; 123/73 AD; 73/40, 73/53.01, 117.3
See application file for complete search history.

(56) References Cited

U.S. PATENT DOCUMENTS 4,847,768 A * 7/1989 Schwartz et al. ........ 364/424.03
5,382,942 A * 1/1995 Raffa et al. ................ 340/457.4
6,172,602 B1 * 1/2001 Hasfjord ....................... 340/438
6,266,587 B1 * 7/2001 Guertler et al. ................. 701/30
6,327,900 B1 * 12/2001 Mc Donald et al. ............ 701/30

FOREIGN PATENT DOCUMENTS

JP A599784 1/1984
JP 216843 4/1990

* cited by examiner

*Primary Examiner* — Davetta W Goins
(74) *Attorney, Agent, or Firm* — Birch, Stewart, Kolasch & Birch, LLP

(57) ABSTRACT

An oil exchange timing indicating apparatus for vehicles capable of informing a user of an exchange timing of oil on the basis of the degree of degradation of oil as quickly as possible. An oil exchange timing indicating apparatus includes an odometer for integrating vehicle travel distances, an operation time integrator for integrating operation times of an engine mounted on the vehicle, an oil exchange informing device for informing a user of an exchange timing of oil, and a controlling device for starting, when either an integrated value of the travel distances or an integrated value of the operation times, based on signals from the odometer and the operation time integrator exceeds a preset value, the oil exchange informing device to inform the user of the exchange timing of oil.

18 Claims, 2 Drawing Sheets

OIL EXCHANGE TIMING INDICATING APPARATUS FOR VEHICLES

BACKGROUND OF THE INVENTION

1. Field of the Invention

The present invention relates to an oil exchange timing indicating apparatus for vehicles.

2. Description of Background Art

In prior art vehicles, oil for lubricating engines or the like is exchanged so as to compensate degradation of the oil.

Methods for informing users of such an exchange timing of oil are known, for example, from Japanese Patent Publication No. Hei 2-16849 and Japanese Patent Laid-open No. Sho 59-9784.

In the former, an oil degradation sensor is provided to directly recognize degradation of oil for indicating the exchange timing of oil. In the latter, the periods of time when oil has been actually used are integrated and the exchange timing of oil is indicated on the basis of the integrated periods of time.

However, the following points that need to be improved are not improved with the prior art. Namely, as with the former, in the case where the degradation of oil is directly recognized by the sensor, the configuration of the sensor is complicated, thus, raising the cost of the sensor. As with the latter, in the case where the exchange timing of oil is set on the basis of the integrated periods of time, there occurs a variation in degradation of oil at the exchange timing of oil.

More specifically, the degree of degradation of oil differs between where the vehicle travels in a long distance for a short time and where the engine is left aside under an idling state for a long time.

SUMMARY AND OBJECTS OF THE INVENTION

In view of the foregoing, it is an object of the present invention to provide an oil exchange timing indicating apparatus for vehicles, which is capable of informing a user of an exchange timing of oil on the basis of the degree of degradation of oil as strictly as possible.

An oil exchange timing indicating apparatus for a vehicle according to the present invention includes odometer means for integrating travel distances of the vehicle; operation time integrator means for integrating operation times of an engine mounted on the vehicle; oil exchange informing means for informing a user of the exchange timing of the oil; and controlling means for starting, when either an integrated value of the travel distances or an integrated value of the operation times, based on signals from the odometer means and the operation time integrator means exceeds a preset value, the oil exchange informing means to inform the user of the exchange timing of oil.

An oil exchange timing indicating apparatus for a vehicle according to the present invention includes a controlling means that stores a plurality of different preset integrated values relating to each of said integrated value of travel distance and operation time, and the controlling means receives, when the integrated value exceeds a smaller preset integrated value and the exchange of oil is carried out, an oil exchange signal to rewrite the smaller preset integrated value to a following larger preset integrated value successively.

An oil exchange timing indicating apparatus for a vehicle according the present invention includes an oil exchange signal that is generated by operating a reset switch mounted on the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention will be described with reference to the drawings.

Figure 1:
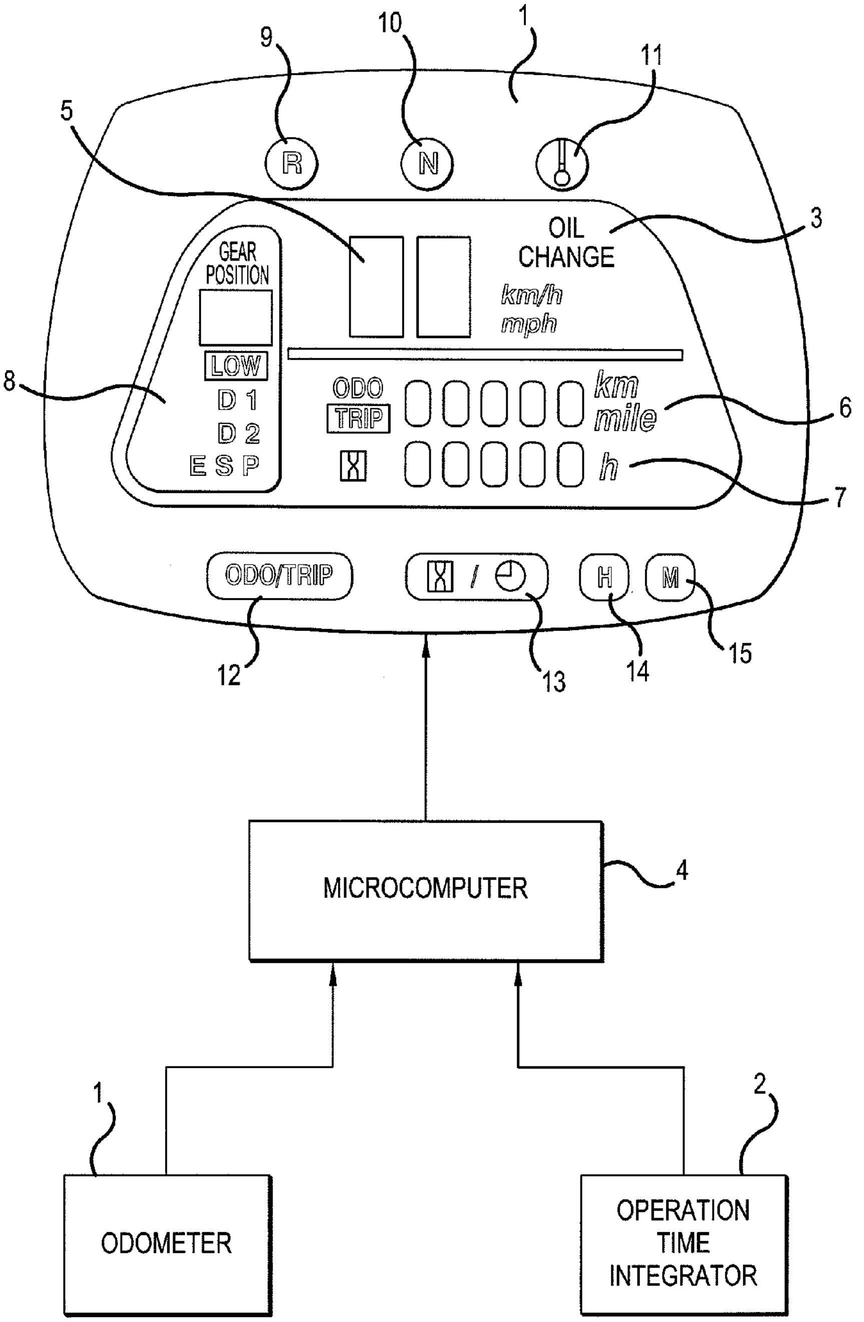
FIG. 1 is a systematic diagram showing one embodiment according to the present invention.

FIG. 1 is a systematic diagram of an oil exchange timing indicating apparatus according to the embodiment. The apparatus includes an odometer 1 for integrating travel distances of a vehicle; an operation time integrator 2 for integrating operation times of an engine; an oil exchange informing means 3 for informing a user of the exchange timing of oil; and a microcomputer 4 as a controlling means for controlling the starting of the oil exchange informing means 3 on the basis of detected signals from the odometer 1 and the operation time integrator 2.

The oil exchange informing means 3 is provided with the indication of "OIL CHANGE" on a portion of an indicator panel I mounted on the vehicle. The indication is turned up by means of a lamp (not shown) attached on the back of the indicator panel I.

The indicator panel I includes a speed indicator unit 5, a travel distance indicator unit 6, a time indicator unit 7, a shift position indicator unit 8, a reverse indicator lamp 9, and a neutral indicator lamp 10. The speed indicator unit 5 indicates a vehicle speed switchably either in kilometers or in miles. The travel distance indicator unit 6 switchably indicates either an integrated travel distance or a travel distance from any point in time. The time indicator unit 7 switchably indicates either an hour or a travel time. The shift position indicator unit 8 indicates shift positions. The reverse indicator lamp 9 indicates that gears are located at a reverse position. And the neutral indicator lamp 10 indicates that the gears are located at a neutral position. Furthermore, the indicator panel I includes an oil temperature warning lamp 11, a distance indication changing-over switch 12, a time indication changing-over switch 13, an hour reset button 14, and a minute reset button 15. The oil temperature warning lamp 11 indicates that the temperature of engine oil reaches a predetermined level. The distance indication changing-over switch 12 changes over the indication of travel distance on the travel distance indicator unit 6. The time indication changing-over switch 13 changes over the indication on the time indicator unit 7. The hour reset button 14 adjusts the "hours" on the time indicator unit 7. The minute reset button 15 adjusts the "minutes".

The microcomputer 4 stores a preset value L1, corresponding to an exchange timing of the oil, of an integrated value L of travel distances, and a preset value T1, corresponding to an exchange timing of oil, of an integrated value T of engine operation times. The integrated value L of travel distances is compared with the preset value L1, and the integrated value T of engine operation times is compared with the preset value T1. On the basis of the results of the comparisons, the oil exchange timing informing means 3 is controlled.

The preset value L1 corresponding to the integrated value L of travel distances is set based on a relationship between the travel distance and the degree of degradation of oil irrespective of the engine operation time. On the other hand, the preset value T1 corresponding to the integrated value T of engine operation times is set based on a relationship between the engine operation time and the degree of degradation of oil irrespective of the travel distance.

Figure 2:
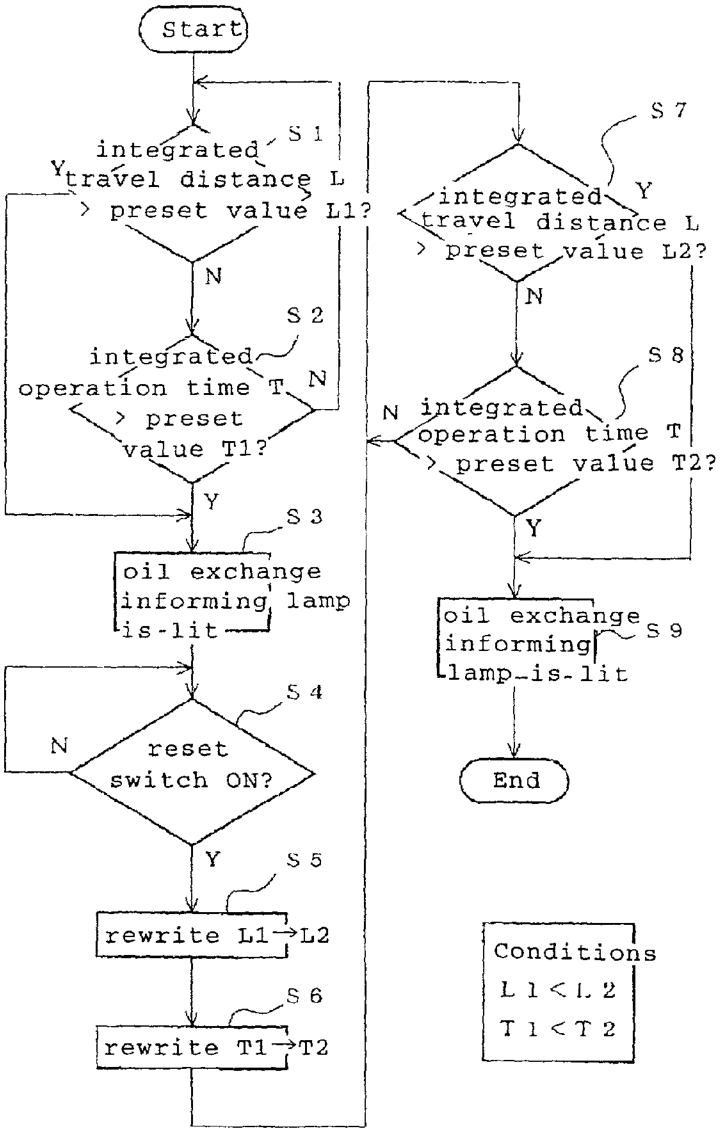
FIG. 2 is a flowchart for illustrating the function of the present invention.

The function of the present embodiment configured as described above will be described with reference to a flowchart of FIG. 2.

When the vehicle engine is started, the odometer 1 and the operation time integrator 2 are started, to initiate the integration of travel distances and the integration of engine operation time, respectively. The microcomputer 4 continuously compares the integrated value L with the preset value L1 stored therein, and the integrated value T with the preset value T1 stored therein, respectively (steps S1 and S2).

In the steps S1 and S2, when the integrated value L or T exceeds the corresponding preset value L1 or T1 (step S3), the oil exchange timing informing means 3 is lit (illuminated) to inform a user of the exchange timing of oil.

In the embodiment as describe above, since the degree of the degradation of oil is monitored through both of the vehicle travel distance and the engine operation time, it is possible to inform a user of the exchange timing of oil on the basis of the degree of the degradation of oil as strictly as possible.

Besides, the configuration of the apparatus can be significantly simplified.

On the other hand, it is possible to set a plurality of the preset values L1 and T1. For example, the preset value L1 and the preset value T1 are set at small values, and the preset value L2 and the preset value T2 are set at values larger than the preset values T1 and L1, respectively. Thus, the second exchange timing of oil can be set longer than the first exchange timing of oil.

The function where a plurality of preset values are given as described above will be described with reference to a flowchart of FIG. 2.

The processes from step 1 to 3 are the same as those of the embodiment described above. After the exchange of oil is informed based on the preset value L1 or T1, if the fact that oil has been exchanged is inputted to the microcomputer by the user (step 4), the microcomputer 4 rewrites the preset value L1 and the preset value T1 stored therein to the preset value L2 and the preset value T2, respectively (steps S5 and S6). The inputting operation is carried out, for example, by pressing a reset switch attached to the oil exchange informing means 3.

The integration of travel distances and the integration of operation times are continuously performed. The integrated value L is compared with the rewritten preset value L2, and the integrated value T is compared with the rewritten preset value T2 in steps S7 and S8. When one of the integrated values L and T exceeds the corresponding preset value L2 or T2, the oil exchange informing means 3 is lit, (illuminated) as set forth in step S9, for informing the user of the exchange timing of oil.

While a preferred embodiment of the invention has been described using various shapes and dimensions of components, such description is for illustrative purposes only, and it is to be understood that changes and variations may be made according to design requirements.

As described above, according to the oil exchange indicating apparatus for vehicles of the present invention, since the degree of the degradation of oil is monitored through both of the vehicle travel distance and the engine operation time, it is possible to inform users of the exchange timing of oil on the basis of the degree of the degradation of oil as quickly as possible.

Moreover, a user may be informed of the exchange timing of oil with a simple configuration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil exchange timing indicating apparatus for a vehicle, comprising:

odometer means for integrating travel distances of the vehicle;

operation time integrator means for integrating operation times of an engine mounted on the vehicle;

oil exchange informing means for informing a user of exchange timing of oil; and controlling means for starting, when either an integrated value of the travel distances or an integrated value of the operation times, based on signals from said odometer means and said operation time integrator means exceeds a preset value, said oil exchange informing means to inform the user of the exchange timing of oil.

2. The oil exchange timing indicating apparatus according to claim 1, wherein said controlling means stores a plurality of distinct preset integrated values relating to each of said integrated value of travel distance and operation time, and said controlling means receives, when said integrated value exceeds a smaller preset integrated value and the exchange of oil is carried out, an oil exchange signal to rewrite a first predetermined preset integrated value to a second predetermined preset integrated value successively.

3. The oil exchange timing indicating apparatus according to claim 2, wherein said oil exchange signal is generated by operating a reset switch mounted on the vehicle.

4. The oil exchange timing indicating apparatus for a vehicle according to claim 1, wherein said oil exchange informing means includes a light that is selectively illuminated for informing a user of the exchange timing of oil.

5. The oil exchange timing indicating apparatus for a vehicle according to claim 1, wherein said controlling means includes a microcomputer for storing a plurality of preset values for the travel distances and the operation time and for integrating the preset values for the travel distances and the operation time to provide an output for advising a user of the exchange timing of oil.

6. The oil exchange timing indicating apparatus for a vehicle according to claim 1, wherein a preset value for the travel distances is set based on a relationship between the travel distances and the degree of degradation of oil.

7. The oil exchange timing indicating apparatus for a vehicle according to claim 1, wherein a preset value for the operation time is set based on a relationship between the operation time and the degree of degradation of oil.

8. The oil exchange timing indicating apparatus for a vehicle according to claim 6, wherein when the integrated value of the travel distance exceeds a corresponding value, a user is advised of the exchange time of oil.

9. The oil exchange timing indicating apparatus for a vehicle according to claim 7, wherein when the integrated value of the operating time exceeds a corresponding value, a user is advised of the exchange time of oil.

10. An oil exchange timing indicating apparatus for a vehicle, comprising:

an odometer for determining travel distances of a vehicle and for generating a travel distance signal;

an operational timer determining the time of operation of an engine of a vehicle and for generating a time of operation signal;

oil exchange indicator for informing a user of an exchange time for oil; and a controller for comparing at least one of a travel distance and a time of operation based on signals from said odometer and said time of operation as compared to a preset value for the travel distance and the time of operation, and for providing a signal to the oil exchange indicator inform the user of the exchange timing of oil.

11. The oil exchange timing indicating apparatus according to claim 10, wherein said controller stores a plurality of distinct preset integrated values relating to each of said value of travel distance and operational time, and said controller receives, when said value exceeds a smaller preset integrated value and the exchange of oil is carried out, an oil exchange signal to rewrite a first predetermined preset value to a second predetermined preset value successively.

12. The oil exchange timing indicating apparatus according to claim 11, wherein said oil exchange signal is generated by operating a reset switch mounted on the vehicle.

13. The oil exchange timing indicating apparatus for a vehicle according to claim 10, wherein said oil exchange indicator includes a light that is selectively illuminated for informing a user of the exchange timing of oil.

14. The oil exchange timing indicating apparatus for a vehicle according to claim 10, wherein said controller includes a microcomputer for storing a plurality of preset values for the travel distances and the time of operation and for integrating the preset values for the travel distances and the time of operation to provide an output for advising a user of the exchange timing of oil.

15. The oil exchange timing indicating apparatus for a vehicle according to claim 10, wherein a preset value for the travel distances is set based on a relationship between the travel distances and the degree of degradation of oil.

16. The oil exchange timing indicating apparatus for a vehicle according to claim 10, wherein a preset value for the time of operation is set based on a relationship between the time of operation and the degree of degradation of oil.

17. The oil exchange timing indicating apparatus for a vehicle according to claim 15, wherein when the integrated value of the travel distance exceeds a corresponding value, a user is advised of the exchange time of oil.

18. The oil exchange timing indicating apparatus for a vehicle according to claim 16, wherein when the integrated value of the operating time exceeds a corresponding value, a user is advised of the exchange time of oil.

* * * * *